US012658485B2

(12) United States Patent
Gupta et al.

(10) Patent No.: US 12,658,485 B2
(45) Date of Patent: Jun. 16, 2026

(54) SYSTEMS AND METHODS FOR EFFICIENT AND SCALABLE DESIGN OF BATTERY PACKS

(71) Applicant: Meta Platforms Technologies, LLC, Menlo Park, CA (US)

(72) Inventors: Ankur Gupta, Redwood City, CA (US); Sachin Ramesh Chandra, Bothell, WA (US); Eunbit Cho, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 604 days.

(21) Appl. No.: 18/166,373

(22) Filed: Feb. 8, 2023

(65) Prior Publication Data

US 2023/0261269 A1 Aug. 17, 2023

Related U.S. Application Data

(60) Provisional application No. 63/311,400, filed on Feb. 17, 2022.

(51) Int. Cl.
H01M 10/42 (2006.01)
H01M 50/284 (2021.01)
H01M 50/519 (2021.01)

(52) U.S. Cl.
CPC ....... H01M 10/425 (2013.01); H01M 50/519 (2021.01); *H01M 2010/4271* (2013.01)

(58) Field of Classification Search
CPC .............. H01M 10/425; H01M 10/42; H01M 2010/4271; H01M 50/284; H01M 50/519; Y02E 60/10

(Continued)

(56) References Cited

U.S. PATENT DOCUMENTS

2009/0128968 A1 5/2009 Lu et al.
2014/0266051 A1* 9/2014 Hayakawa ................ H02J 7/54
320/118

(Continued)

FOREIGN PATENT DOCUMENTS

KR 20190086324 A * 7/2019 ............. H05K 1/185
WO WO-2012132709 A1 * 10/2012 ............. H01L 24/73

OTHER PUBLICATIONS

Advances in Embedded & Fan Out Wafer Level_Keser et al._pp. 1 to 38 & 141-167 & 201-215_2019.*

(Continued)

*Primary Examiner* — Timothy J Thompson
*Assistant Examiner* — Guillermo J Egoavil
(74) *Attorney, Agent, or Firm* — McDermott Will & Schulte LLP

(57) ABSTRACT

In one embodiment, a battery monitoring unit for monitoring a battery pack may include a first power MOSFET transistor with at least three pads, and a printed-circuit board with at least three copper layers. The first copper layer may have vias that connect electrical components amounted on the printed-circuit board. The second copper layer may have a first area where copper material is excluded. The first power MOSFET transistor is embedded (1) in the first area of the second copper layer where the copper material is excluded, and (2) between the first copper layer and the third copper layer. The two pads of the power MOSFET may be plated with copper. The first power MOSFET transistor may be connected to the one or more first electrical components through the at least three pads plated with copper.

20 Claims, 11 Drawing Sheets

(58) Field of Classification Search
USPC ............................................. 361/748; 429/7
See application file for complete search history.

(56) References Cited

U.S. PATENT DOCUMENTS

| | | | |
|---|---|---|---|
| 2018/0130747 A1 * | 5/2018 | Tuominen | H01L 24/20 |
| 2018/0205055 A1 | 7/2018 | Hilligoss et al. | |
| 2019/0124772 A1 | 4/2019 | Stahr et al. | |
| 2022/0020669 A1 * | 1/2022 | Mcknight-Macneil | ...................... |
| | | | H01L 23/5389 |

OTHER PUBLICATIONS

Automotive PWR Module Packaging_Yang et al._160126 to 160144_ Sep. 2020.*

Consumer Electronics Solution_ONSEMI_pp. 47-51_Dec 2019.*

Evaluation of the PCB Embedding Technology_Caillaud et al._pp. 1-6_2019.*

Innovative & Reliable Power Modules a Future Trend & Evolution_ Neeb et al._pp. 6 to 16_Sep. 2014.*

Innovative & Reliable PWR MOD a Future Trend & Evolution_ Neeb et al._pp. 6 to 16_Sep. 2014.*

Si8401DB & Package Information & AN824_Vishay_pp. 2-10_ Aug. 2022.*

International Search Report and Written Opinion for International Application No. PCT/US2023/013229, mailed Jun. 30, 2023, 9 pages.

International Preliminary Report on Patentability for International Application No. PCT/US2023/013229, mailed Aug. 29, 2024, 8 pages.

* cited by examiner

200B

Copper Plated Pad 203B

Pad 204B

Copper Plated Pad 203A

Pad 204A

Power MOSFET 201

600B

700

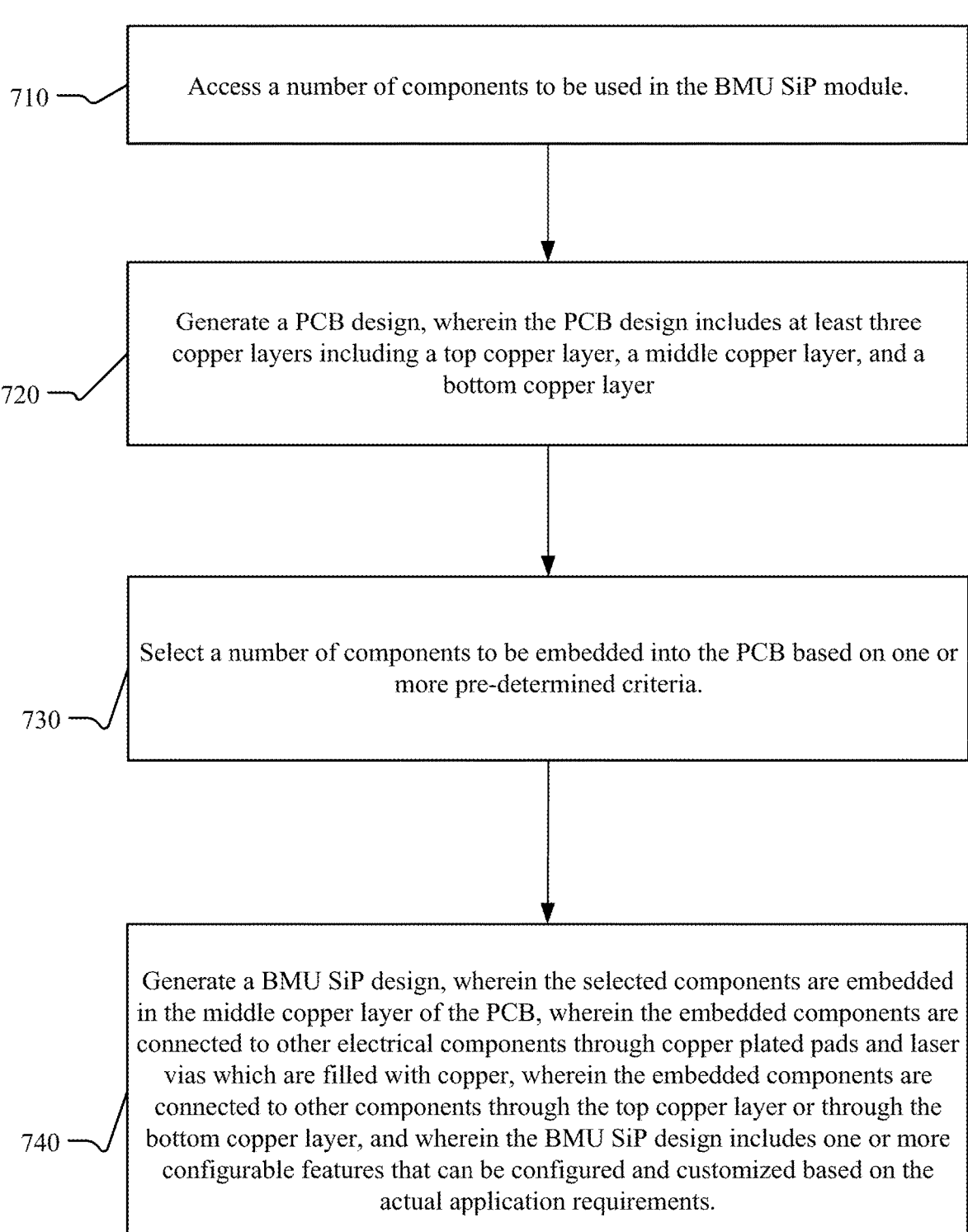

710 — Access a number of components to be used in the BMU SiP module.

720 — Generate a PCB design, wherein the PCB design includes at least three copper layers including a top copper layer, a middle copper layer, and a bottom copper layer 730 — Select a number of components to be embedded into the PCB based on one or more pre-determined criteria.

740 — Generate a BMU SiP design, wherein the selected components are embedded in the middle copper layer of the PCB, wherein the embedded components are connected to other electrical components through copper plated pads and laser vias which are filled with copper, wherein the embedded components are connected to other components through the top copper layer or through the bottom copper layer, and wherein the BMU SiP design includes one or more configurable features that can be configured and customized based on the actual application requirements.

*FIG. 7*

SYSTEMS AND METHODS FOR EFFICIENT AND SCALABLE DESIGN OF BATTERY PACKS

PRIORITY

This application claims the benefit under 35 U.S.C. § 119(e) of U.S. Provisional Patent Application No. 63/311, 400, filed 17 Feb. 2022, which is incorporated herein by reference.

TECHNICAL FIELD

This disclosure generally relates to artificial reality, such as virtual reality and augmented reality.

BACKGROUND

A battery pack includes a number of individual battery cells. Such battery cells or units may be configured in a series, parallel or a mixture of both for storing energy. Components of battery packs include the individual battery cells and the electrical connections that provide electrical conductivity between them. Battery packs can be applied in many electrical devices or vehicles. A battery pack may include a battery monitoring unit that can be used to monitor the conditions of the battery pack.

SUMMARY OF PARTICULAR EMBODIMENTS

Embodiments described in this disclosure includes systems and methods for miniaturization of circuits to efficiently pack electrical components with embedding, stacking, and/or encapsulation, using advanced packaging technologies. The systems and methods provide effective solutions in design, engineering, and operation inefficiency for BMU in the battery industry. Advanced packaging technologies such as embedding and stacking can enable more efficient use of components in the BMU. Embedding key components in the BMU help reduce the overall area and allow volumetric energy density to be gained back. Similarly, stacking components on the top of the power FETs (e.g., power MOSFET) or under the FETs may achieve a similar goal of designing in three dimensions. Strategically choosing these components may reduce any tradeoff with thickness. The systems and methods may allow a design to have the thinnest yet widest area components (e.g., the power MOSFETS) to be embedded into the substrate of a BMU or stacked below/on the top of other components to save X-Y area while minimizing impact on Z thickness. In addition, the resistors in the BMU may also be embedded as well to isolate the power path plane from the signal plane optimizing the use of the volume and increasing performance of the device.

In particular embodiments, to achieve the ability to embed the FET into the substrate, the pads on the FET may be plated in copper in order to better integrate with laser vias. Laser vias may be required to make electrical contact to any components or copper layers inside a substrate and they are copper filled. Typical FETs may be meant to be amounted by surface amounted technology onto a board and because of that, the finish on the pads may tend to be Ni/Au in order to be better compatible with solder paste. Because the electrical interface may be different in design, a similar change in the material may be needed (the need for copper plated FETs). The copper plating on the FETs may integrate well with the copper filled via which makes a robust electrical connection.

In particular embodiments, to achieve the ability of utilizing the FET area without embedding, the FET may be stacked on the top of a protection IC or vice versa, the protection IC may be stacked on the top of the FET. The die bonding technology may be used when the component on the top would have wire bonds coming from the wirebond pads on the top to the substrate surface and the component on bottom would be mounted using surface-mount technology to that surface. This approach may remove a large portion of the area consumed by the FET and may allow the BMU to be built in 3D.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 7 illustrates an example method of designing BMU system-in-package (SiP) module with embedded components.

DESCRIPTION OF EXAMPLE EMBODIMENTS

Figure 1:
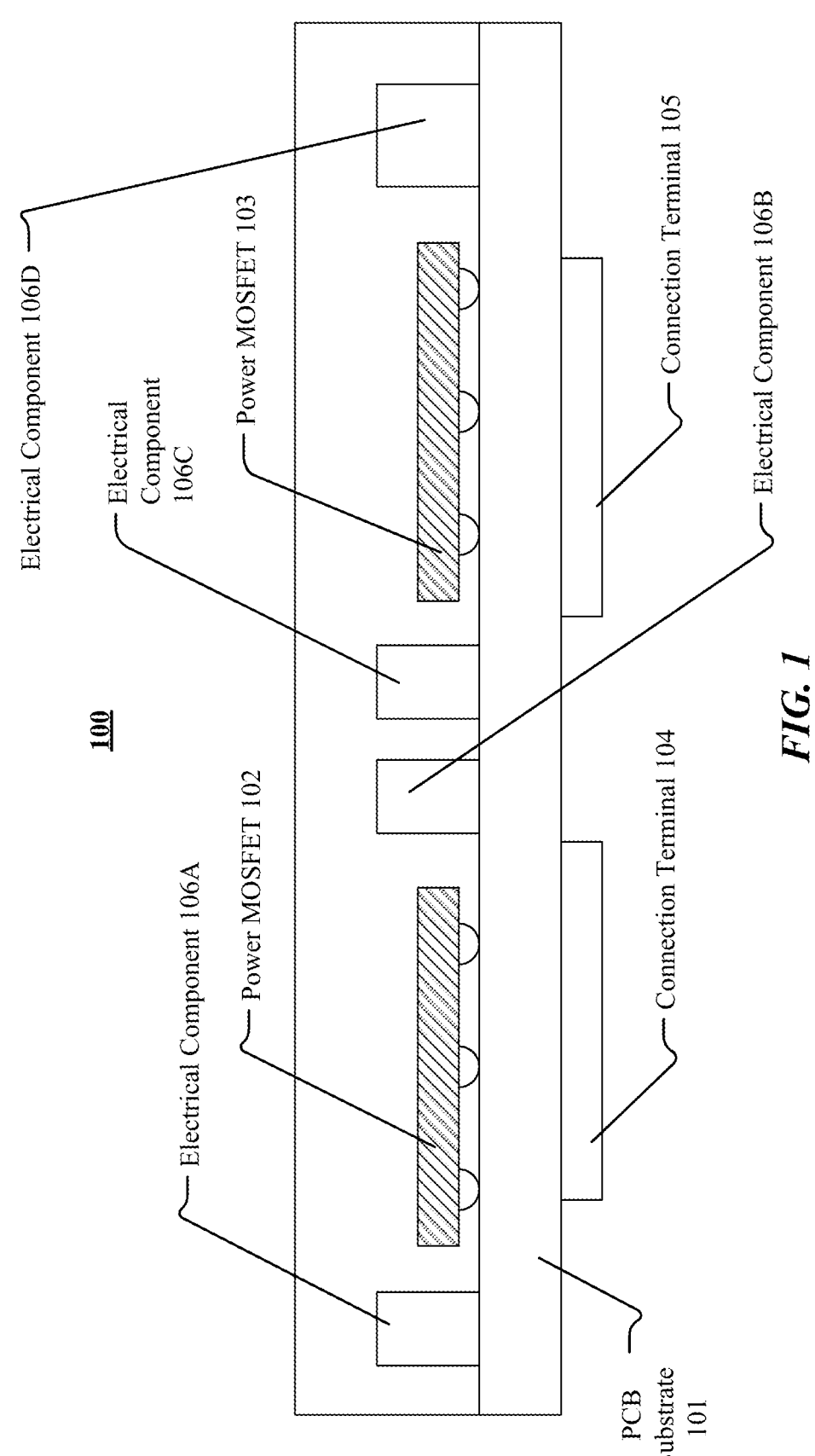
FIG. 1 illustrates an example electronic component arrangement in a traditional battery monitoring unit (BMU).

Batteries used in consumer electronics and EV may have Battery Monitoring Unit (BMU) or Battery Management System (BMS) that monitors and manages battery charging to ensure the batteries and electronic systems are running in safe and optimum condition. A typical battery pack structure in consumer electronics may be composed of battery cells and BMU. The BMU may include a printed circuit board (e.g., a rigid or flexible PCB) with board electrical components that ensures the battery to operate within its safety limits. The electrical components may be integrated via surface mount technology (SMT) and can be encapsulated for more protection. Examples of these components may include, but not limited to, charger ICs, battery state and health ICs, resistors, capacitors, diodes, and negative temperature coefficient (NTC). While similar sub-components may be used in BMU manufacturing, the manufacturing process and design may often be unique to battery and system specification. Thus, every time there is a new battery or a product, a new BMU design and manufacturing process may be needed. Typically, this may consume a lot of engineering and development overhead and may lack efficiency in production.

The batteries used in consumer electronic products may use Li-ion battery chemistry because of its high energy density. Even with Li-ion battery technology, there may be not enough space and power in smaller products. Traditional BMU technologies may have a fundamental limit of how small they can be made, resulting in a design that needs to take up more area than would be available when maximizing energy density. This may result in volume taken away from the cell in order to fit the entire pack design in a specific volume. Another big challenge may be the engineering and operation overhead for BMU design and process for each battery design. Overall, conventional BMU designs may have a number of issues in modern consumer electronic products. For example, capacity and volume of a battery pack may be directly correlated. Modern consumer electronics may require higher capacity and power, while smaller space and volume are desired. As another example, unique BMU design and process for every product may require a lot of resources and overhead for a company. This could be inefficient but necessary in the conventional BMU ecosystem.

Embodiments described in this disclosure includes systems and methods for miniaturization of circuits to efficiently pack electrical components with embedding, stacking, and/or encapsulation using advanced packaging technologies. The systems and methods provide effective solutions in design, engineering, and operation inefficiency for BMU in the battery industry. Advanced packaging technologies such as embedding and stacking can enable more efficient use of components in the BMU. Embedding key components in the BMU help reduce the overall area and allow volumetric energy density to be gained back. Similarly, stacking components on the top of the power FETs (e.g., power MOSFET) or under the FETs may achieve a similar goal of designing in three dimensions. Strategically choosing these components may reduce any tradeoff with thickness. The systems and methods may allow a design to have the thinnest yet widest area components (e.g., the power MOSFETS) to be embedded into the substrate of a BMU or stacked below/on the top of other components to save X-Y area while minimizing impact on Z thickness. In addition, the resistors in the BMU may also be embedded as well to isolate the power path plane from the signal plane optimizing the use of the volume and increasing performance of the device.

In particular embodiments, to achieve the ability to embed the FET into the substrate, the pads on the FET may be plated in copper in order to better integrate with laser vias. Laser vias may be required to make electrical contact to any components or copper layers inside a substrate and they are copper filled. Typical FETs may be meant to be amounted by surface amounted technology onto a board and because of that, the finish on the pads may tend to be Ni/Au in order to be better compatible with solder paste. Because the electrical interface may be different in design, a similar change in the material may be needed (the need for copper plated FETs). The copper plating on the FETs may integrate well with the copper filled via which makes a robust electrical connection.

In particular embodiments, to achieve the ability of utilizing the FET area without embedding, the FET may be stacked on the top of a protection IC or vice versa, the protection IC may be stacked on the top of the FET. The die bonding technology may be used when the component on the top would have wire bonds coming from the wirebond pads on the top to the substrate surface and the component on bottom would be mounted using surface-mount technology to that surface. This approach may remove a large portion of the area consumed by the FET and may allow the BMU to be built in 3D.

A key advantage of miniaturization BMU using this technology is that this technology allows the BMU miniaturization to be coupled with a standardized architecture. A BMU module may be made in a way that it can protect, gauge, charge, and otherwise fully manage the cell it is connected to. The BMU module can be versatile and programmed for different use cases. Due to its small size, it could fit in a wide variety of pack designs without requiring custom BMU design for each pack as the traditional BMU technology. This provides a large degree of freedom in system architectures and pack designs. Modules can be designed for different overarching goals such as high power and low-capacity cells as well as different chemistries. As an example, this technology can significantly simplify the BMU design flow and reduce the time and resource requirements for designing and developing BMUs for different applications. The traditional design flow for BMUs has inefficiencies in design process, because the BMUs have to be built from separate electrical components with very few standardizations on the components. In the traditional design flow for BMUs, the only standardization is on the components in BOM (Bill of Materials). Each design layout is tied with specific custom components and BMU, which creates a lot of engineering resources and complicated supply chain workflow processes. This traditional BMU design method is even worse when it comes to dual-sourcing or multi-sourcing.

On the other hand, the systems and methods as described in this disclosure allows the design work to be done as an integrated part. This technology may be referred to as BMU SiP (system in package) in this disclosure. Essentially, the BMU SiP may work as a module that can go into any BMU design. It can be a universal design solution that can be used for multiple programs with different applications simultaneously. The standardization of custom parts for BMUs may allow scalability and flexibility in sourcing. These benefits translate to cost saving in R&D overhead with high efficiency as well as CapEx/OpEx and unit cost savings from a high volume/scalability.

FIG. 1 illustrates an example electronic component arrangement 100 in a traditional battery monitoring unit (BMU). Traditional BMU may include a PCB (printed-circuit board) substrate 101, one or more power MOSFETs (e.g., 102 and 103), one or more connection terminals (e.g., 104 and 105), and other electrical components (e.g., 106A, 106B, 106C, 106D), etc. In this disclosure, the term "power MOSFET" may refer to a type of metal-oxide-semiconductor field-effect transistor (MOSFET) designed to handle a pre-determined level of power. The term "FET" may refer to field-effect transistor. The PCB substrate 101 may be a substrate of a one-layer PCB or multiple-layer PCB for the traditional BMU design. The power MOSFET (e.g., 102 and 103) may be mounted on the surface of the PCB substrate 101 using the surface mounting technology (SMT). The other electrical components (e.g., 106A, 106B, 106C and 106D) may be other type of electrical components, for example, but not limited to, charger ICs, resistors, capacitors, diodes, NTC (negative temperate coefficient), etc. Some of these components may have a greater thickness than the power MOSFETs.

In particular embodiments, advanced packaging technologies such as embedding components into PCB substrate and/or stacking components on the top of other components may be used to enable more efficient arrangement of components in the BMU. Selectively embedding some electrical components used in the BMU into PCB substrate may reduce the overall area of the BMU and may allow the battery pack to have an increased volumetric energy density. Similarly, selectively stacking some components on the top of the FETs or under the FETs may achieve BMU designs in three dimensions and reduce the overall area used by BMUs. Strategically choosing these components may allow the BMUs to reduce the X-Y dimensions without substantially increasing in the Z-dimension. In particular embodiments, the new BMU design method may allow the thinnest components in the Z direction yet with the greatest area in the X-Y plane to be embedded into the substrate of a BMU or to be stacked below/on the top of other components to save the X-Y area while minimizing impact on the Z thickness. Such components may include, for example, but not limited to, power MOSFETs, resistors, etc. In particular embodiments, the resistors in the BMU may optionally be embedded to isolate the power path plane from the signal plane optimizing the use of the volume and increasing performance of the BMUs.

In particular embodiments, the components that are to be embedded or stacked may be selected based on one or more pre-determined criteria. In particular embodiments, the pre-determined criteria may be based on a comparison of the component's thickness in the Z direction to its other two dimensions in the X-Y plane (e.g., a ratio of the components' thickness to its length and/or width). In general, the components that are thin in the Z-direction but are large in the X-Y plane may be suitable to be embedded to the PCB substrate or stacked on the top or under the bottom of other components, because such components would take a large area if mounted on the surface of the PCB but will have less impact on the Z direction thickness of BMUs if embedded or stacked. For example, the component to be embedded to tacked may have a thickness-to-length ratio and/or thickness-to-width ratio falling with a pre-determined ratio range or satisfying a pre-determined threshold criterion.

In particular embodiments, the pre-determined criteria may be based on a comparison of dimension parameters (e.g., a thickness, length, or width) to the dimension parameters (e.g., a thickness, length, or width) of other electrical components. In general, among all the electrical components, the thinner components may be more suitable to be embedded or stacked, because they have the less impact on the Z direction thickness of BMUs. For example, the components that are to be embedded may need to be thinner than some of other type of electrical components or may need to be the thinnest component type used the BMUs.

In particular embodiments, the components to be embedded may need to have a thickness within a pre-determined thickness range or being thinner than a threshold thickness, so that the PCB board can accommodate the embedded components in the Z direction. The PCB design, manufacturing, and assembling process may have limitation on the copper layer thickness and PCB substrate thickness, which may further post a limitation on the thickness of the components to be embedded within the PCB layers. For example, the thickness of the components to be embedded may need to fall within a pre-determined thickness range based on the copper layer thickness and the PCB substrate layer thickness. The components to be embedded may not have a thickness that exceeds the copper layer thickness or PCB substrate layer thickness for a threshold range to be embedded within the PCB layers. It is notable that the limitation from the copper layer thickness and the PCB substrate layer thickness may apply to the components to be embedded within the PCB but may not apply to the components to be stacked on or under other components, because such stacking may be on the surface of the PCB rather than within the PCB layers.

In particular embodiments, the pre-determined thickness range for the components to be embedded may depend on the overall size requirement of the BMU design, such as, the total thickness or height requirement of the BMU. Some BMU may have specific requirements on its height, length and width to fit into the space of a particular battery pack. The systems and methods described in this disclosure may allow a strategic selection on the components to be embedded based on the specific size requirements of the BMU. For example, some battery pack may have a very small area in the X-Y dimensions for the BMU. In such situation, the systems and method may apply a strategy that embeds or stack as much as possible components and also may allow components to be embedded or stacked even they are not the thinnest components. In other words, when the BMU has a very limiting X-Y area to fit in, the systems and method may allow components that are slightly thicker than otherwise to be embedded or stacked.

It is notable that, in particular embodiments, the components to be embedded or stacked may be selected based any of the above criteria or a combination of two or more of the above criteria. For example, a power MOSFET may be selected for embedding or stacking because it's thickness-to-length and/or thickness-to-width ratio fall within the pre-determine range ratio, it is the thinnest component among the components used by the BMU, and/or, its thickness falls within the predetermined thickness range based on the copper layer thickness and the PCB substrate layer thickness (thus it fits in will in the PCB layers).

As an example and not by way of limitation, the power MOSFETs that are to be embedded in the BMU design may have the three-dimension parameters meeting one or more above criteria. For instance, the power MOSFETs may have a thickness dimension in the Z direction that is substantially less than the other two dimensions (i.e., the length and width in the X-Y plane). As another example, the power MOSFETs may be substantially larger in the X-Y plane than many other electrical components, requiring a greater area on the PCB surface if these power MOSFETs are mounted on the surface of the PCB. Also, the power MOSFETs may be thinner than other electrical components used in the BMUs. As such, the power MOSFETs, if mounted on the surface of the PCB substrate, may result in a larger size for the BMU. In contrast, other electrical components (e.g., capacitors, protection ICs) may have different three-dimension parameters and may have a relative greater thickness comparing to their length and width in the X-Y dimensions or comparing to power MOSFETs or other type of components that are selected to be embedded. Also, these electrical components that are less suitable to be embedded may be thicker than the components that are more suitable be embedded.

As such, in particular embodiments, the new BMU design method may embed the power MOSFETs within the PCB substrate or stack the power MOSFET above or under other electrical components, rather than mounting the power MOSFETs on the surface of the PCB as the traditional BMU design. This may allow the BMUs to have a smaller size and take a smaller space in the X-Y dimension, at the same time, without substantially increasing the BMU thickness in the Z dimension (because the power MOSFETs are relatively thin in the Z dimension). As yet another example of the criteria, the power MOSFETs may be thinner than many other electrical components used in the BMUs or may be the thinnest components in the BMU design. In such situations, the power MOSFETs can be embedded in the PCB or stacked above or under other electrical components, with the least amount of increase on the Z direction thickness of the BMU design.

It is notable that the power MOSFETs here are used only for example purpose and the systems and methods described in this disclosure are not limited to power MOSFETs. For example, the systems and methods as described in this disclosure may be applicable to any electronic components that meet the criteria for the three-dimension parameters. In particular embodiments, such criterial may include having a thickness in the Z direction that is substantially less than the other two dimensions in the X-Y directions or having a thickness that is less than many (or most, or all) other electrical components or having a thickness that is less than a pre-determined threshold thickness. Many other electrical components other than the power MOSFET may also meet these criteria and may be selected to be embedded in the PCB substrate. In this disclosure, the term "substantially less" may refer to the relationship that one value is less than another value by a pre-determined ratio or within a pre-determined ratio range comparing to the second value. For example, the thickness of a component that is suitable for embedding may be within a pre-determined ratio range comparing to the component's length and/or width dimensions or may be less than the component's length and/or width dimension by a pre-determined ratio.

Figure 2A:
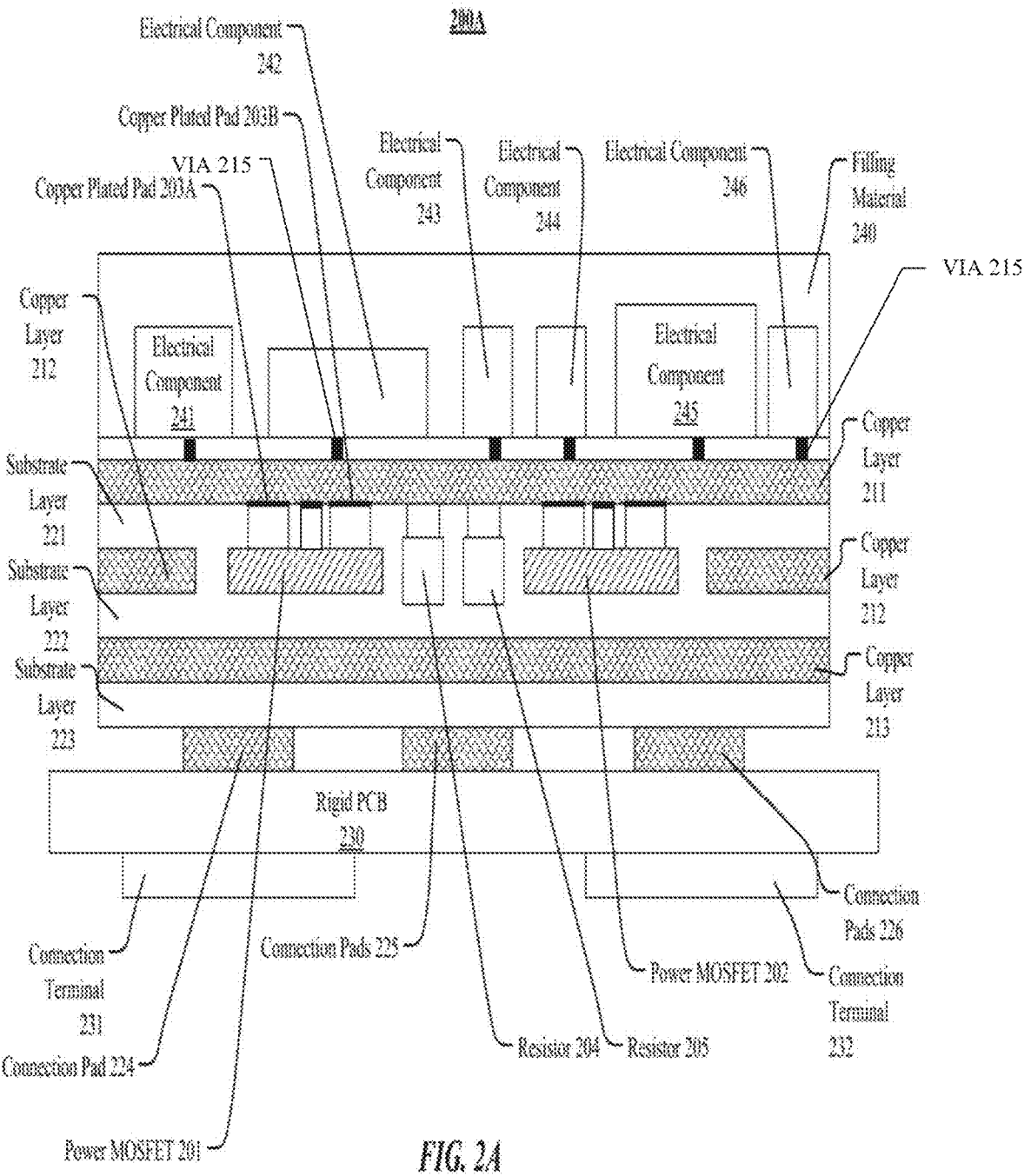
FIG. 2A illustrates an example BMU which includes embedded power MOSFETs.

FIG. 2A illustrates an example BMU 200A which includes embedded power MOSFETs 201 and 202. As an example and not by way of limitation, the BMU 200A may include power MOSFETs 201 and 202, and a number of other electrical components (e.g., 241, 242, 243, 244, 245, and 246). These other electrical components (e.g., 241, 242, 243, 244, 245, and 246) may be, for example, but not limited to, protection ICs, resistors, capacitors, NTC, etc. The power MOSFETs 201 and 202 may have a thickness that is substantially less than the other two dimensions (i.e., the length and width in the X-Y plane) and satisfies one or more criteria as described earlier in this disclosure. Also, the power MOSFETs 201 and 202 may have a thickness that is less than the thickness of other electrical components (e.g., 241, 242, 243, 244, 245, and 246). The power MOSFETs' such characters regarding its thickness may make it suitable to be embedded into the PCB or staked on or under other components. In this example, the PCB may include at least three copper layers 211, 212, and 213. The power MOSFETs 201 and 202 may be embedded in the middle copper layer 212. The copper layer 212 in the middle of the PCB 200A may have areas where copper material is excluded for embedding the power MOSFETs 201 and 202. The power MOSFETs 201 and 202 may be embedded in the middle copper layer 212 in the areas having no copper material. The top copper layer 211, the middle copper layer 212 embedding the power MOSFETs 201 and 202, and the bottom copper layer 213 may form a sandwiched structure for the embedded power MOSFETs 201 and 202. The example BMU 200A may also include multiple connection pads for the device (e.g., 224, 225, 226). In particular embodiments, the PCB for embedding the power MOSFETS may be flexible or rigid PCB. The PCB with the embedded power MOSFETs (and other optionally embedded components) and other electrical components that are mounted on the surface of the PCB may form a system in package (SiP) module. Such SiP module may be attached to a rigid PCB 230 with multiple connection terminals (e.g., 231, 232). The SiP module may be standardized and can be reused in BMU design to simply the BMU design process.

In particular embodiments, the BMU PCB may have additional copper layers and PCB substrate layers in addition to the three layers for embedding the power MOSFETS 201 and 202. The power MOSFETs may be embedded in any suitable layer that can form a sandwiched structure and is not limited to the central layer of the PCB. For example, there may be N layers of copper layers above the copper layer embedding the power MOSFETs and M layers of copper layers below it and the N and M do not need to be equal. In other words, the copper layer embedding the power MOSFETs may have asymmetrical number of copper layers and/or PCB substrate layers above or below it.

In this example as shown in FIG. 2A, the power MOSFETs 201 and 202 may be connected to other electrical components through the top copper layer 211. However, it is notable that the embedded MOSFETS may be connected to other electrical components through either or the top layer 211, or the bottom layer 213. Also, the embedded power MOSFETs are not limited to be connected to other electrical components through a single copper layer. Different power MOSFETs may be connected to other electrical components through different respective copper layers. For example, a first embedded power MOSFET (not shown) may be connected to other electrical components through the top copppery layer 211 and a second embedded power MOSFET (not shown) may be connected to other electrical components through the bottom copper layer 213. In the situations where the PCB has more layers in addition to the three copper layers as shown in FIG. 2A, the power MOSFETs 201 and 202 may be connected to other electrical components through the copper layer right above the embedding copper layer or the copper layer right below the embedding copper layer, or through both.

Figure 2B:
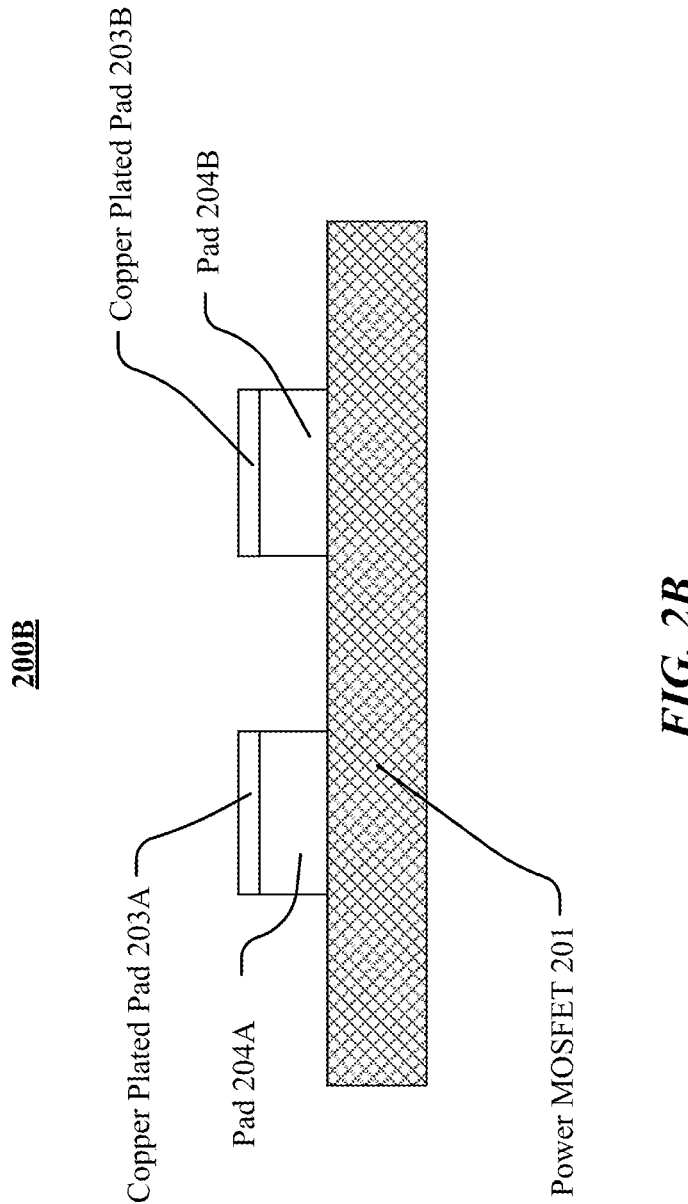
FIG. 2B illustrates an example configuration showing the power MOSFET with copper plated pads.

FIG. 2B illustrates an example configuration 200A showing the power MOSFET 201 with copper plated pads 203A and 203B. In particular embodiments, to allow the power MOSFET to be embedded into the PCB layers, the pads on the power MOSFET may be plated in copper in order to allow the pads to better integrate with laser vias. Laser vias may be needed to make electrical contacts to electrical components or copper layers inside a substrate. Laser vias may be filled by copper material. Traditionally, power MOSFETs may be designed to be amounted by surface amounted technology (SMT) onto a PCB board and because of that, the finish on the pads may tend to be Ni/Au material in order to be better compatible with solder paste. Because the electrical interface may be different in design, a similar change in the material may be needed for the copper plated pads of the power MOSFETs. The copper plating on the power MOSFETs' pads may integrate well with the copper filled via which makes a robust electrical connection. It is notable that the power MOSFETs are used as an example and the components whose pads can be copper plated to facilitate a better connection with laser vias are not limited to power MOSFETs. The systems and methods described in this disclosure are applicable to any suitable electrical components that need to be better connected with laser vias which are filled with copper.

In particular embodiments, the power MOSFETs may be stacked on the top surface of another electrical component or stacked under the bottom surface of that electrical component, to achieve a similar goal of reducing the BMU size in the X-Y dimensions, and at the same time, without significantly increasing the thickness in the Z direction. Strategically choosing these components may be important to reduce the impact on the thickness in the Z direction. In particular embodiments, the components that are relatively thinner in the Z direction yet wider in the X-Y directions (e.g., the power MOSFETs) may be selected to be stacked below or on the top of other components. In particular embodiments, the components that are thinnest in the Z direction yet widest in the X-Y directions among the electrical components used in BMUs may be selected to be stacked below or on the top of other components.

Figure 3:
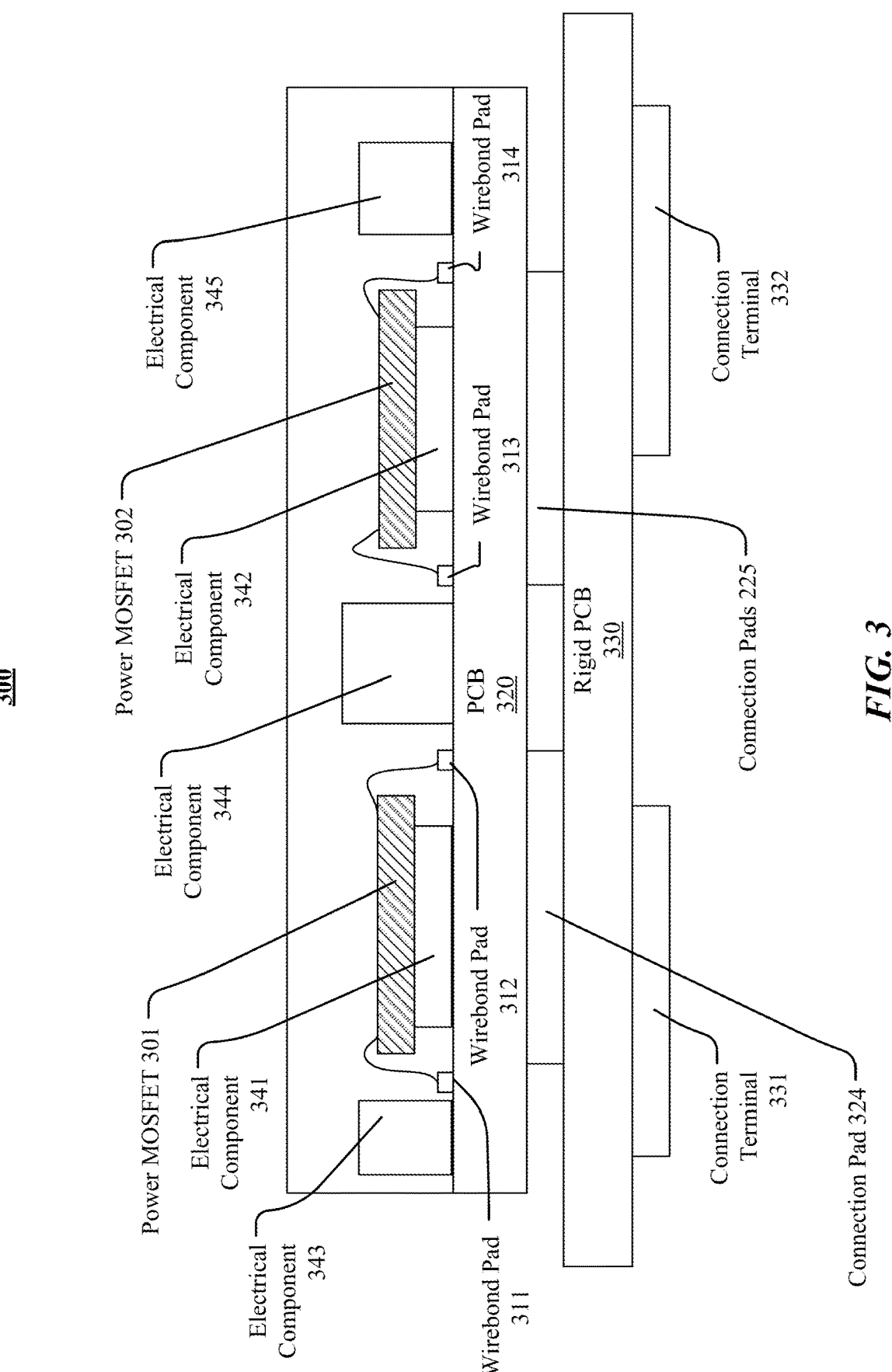
FIG. 3 illustrates an example BMU which includes the power MOSFETs that are stacked on the top of other components.

FIG. 3 illustrates an example BMU 300 which includes the power MOSFETs 301 and 302 that are stacked on the top of other components. As an example and not by way of limitation, the BMU 300 may include power MOSFETs 301 and 302, and a number of other electrical components (e.g., 341, 342, 343, 344, and 345) used by the BMU 300. These other electrical components (e.g., 341, 342, 343, 344, and 345) may be, for example, but not limited to, protection ICs, resistors, capacitors, NTC, etc. The power MOSFETs 301 and 302 may have a thickness that is substantially less than the other two dimensions (i.e., the length and width in the X-Y plane) and satisfies one or more criteria for being embedded or stacked in the BMU design as described earlier in this disclosure. Also, the power MOSFETs 301 and 302 may have a thickness that is less than the thickness of some other electrical components (e.g., 343, 344, and 345). It is notable that, in particular embodiments, the electrical components (e.g., the power MOSFETS) that are selected to be embedded or stacked may not need to be the thinnest component used in the BMU design. For example, the power MOSFETs 301 and 302 may be stacked on the electrical components 341 and 342, which may have the same or similar thickness to the power MOSFETs 301 and 302. The example BMU 200A may include the PCB 320 which may be a flexible PCB or rigid PCB hosting the electrical components (e.g., by containing the embedded components within its layers and/or by supporting the components that are mounted or attached to its surface). The PCB 320 may include a number of wirebond pads (e.g., 311, 312, 313, and 314) and the power MOSFETs 301 and 302 may have conductive wires that come from their top surface and connect to the wirebond pads (e.g., 311, 312, 313, and 314) on the surface of the PBC 320. The electrical components 341 and 342 may be mounted to the surface of the PCB 320.

The PCB 320 with the power MOSFETs 301 and 302 that are stacked on the top of the electrical components 341 and 342, respectively, and other embedded components (if any) within the PCB 320, and other electrical components that are mounted on the surface of the PCB may collectively form a system in package (SiP) module. Such SiP module may be attached to a rigid PCB 330 with multiple connection terminals (e.g., 331, 332). The SiP module may be standardized and can be re-used in design BMUs to simplify the design process of BMUs.

Figure 4:
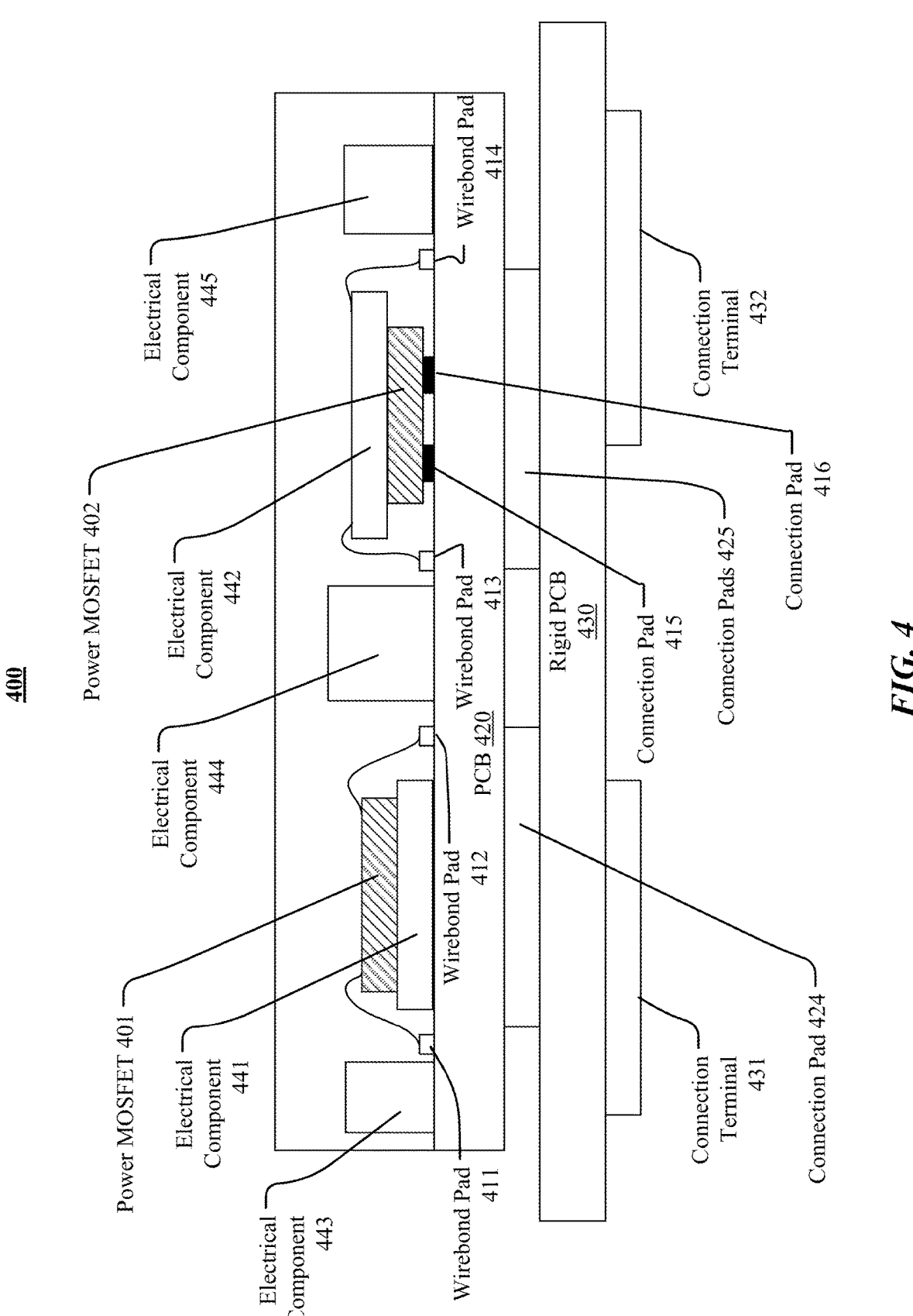
FIG. 4 illustrates an example BMU which includes a first power MOSFET stacked on the top of another component and a second power MOSFET stacked under another component.

FIG. 4 illustrates an example BMU 400 which includes a first power MOSFET 401 stacked on the top of another component 441 and a second power MOSFET 402 stacked under another component 442. As an example and not by way of limitation, the BMU 400 may include power MOSFETs 401 and 402, and a number of other electrical components (e.g., 441, 442, 443, 444, and 445) used in the BMU 400. As shown in FIG. 3, the power MOSFETS (or other components that are suitable for being stacked) may be stacked on the top of other components. However, the components to be stacked are not limited to be stacked in a particular order. For example, the power MOSFETs may be stacked on the top of other components or under other components. In this example as shown in FIG. 4, the power MOSFET 402 may be stacked under the electrical component 442. As such, the power MOSFET 402 may mounted on the surface of the PCB 420 using the SMT. For example, the power MOSFET 402 may be connected to the PCB 420 through the connection pads 415 and 416. The component 442, which is stacked on the top of the power MOSFET 402 may be connected to the PCB 420 through the bond wire coming from its top surface reaching to the wirebond pads 413 and 414 on the surface of the PCB 420. The power MOSFET 402 as shown in FIG. 4 may be smaller in size in the X-Y dimensions that the component 442 stacked on the top of it. However, it is notable that the power MOSFET that are stacked under other components are not limited to have a smaller size than the component on top of it. In particular embodiments, the power MOSFET that are stacked under another component may be smaller, larger, or have the same size with the component above it. Similarly, the power MOSFETs that are stacked on the top of another components may be larger, smaller, or have the same size in the X-Y plane, to the component stacked above it. For example, the power MOSFETs 301 and 302 in the FIG. 3 may have a size in the X-Y plane that is greater than the component stacked below them. As another example, as shown in FIG. 4, the power MOSFET 401 may have a smaller size in the X-Y plane than the component stacked below it. The power MOSFET 401 may be smaller than the components that is stacked under it. The power MOSFET 401 may be connected to the wirebond pads 411 and 412 by the bond wires coming from the top surface of the power MOSFET 401 reaching to the wirebond pads 411 and 412 on the surface of the PCB 420. The PCB 420 with the power MOSFETs 401 and 402 and other electrical components that are embedded in, mounted on, or attached to the PCB 420 may collectively form a system in package (SiP) module. Such SiP module may be attached to a rigid PCB 430 with multiple connection terminals (e.g., 431, 432). The SiP module may be standardized and can be re-used in design BMUs to simplify the design process of BMUs.

In particular embodiments, the BMU designed using the systems and methods described in this disclosure may include both embedded and stacked power MOSFETs, and for the stacked power MOSFETS, they may be larger, smaller, or have the same size in the X-Y plane to the component that they are stacked above or under. As an example and not by way of limitation, the BMU may include a first power MOSFET that is embedded within the PCB layers. The BMU may have a second power MOSFET that is stacked on the top of another component. The second power MOSFET may be larger, smaller, or have the same size in the X-Y plane to the component that it is stacked above. The BMU may have a third power MOSFET that is stacked under another component. The third power MOSFET may be larger, smaller, or have the same size in the X-Y plane to the component that it is stacked under.

In particular embodiments, the BMU may be miniaturized by using the systems and methods as described in this disclosure and by coupling with a standardized architecture. A BMU module may be made that can protect, gauge, charge, and otherwise fully manage the cell it is connected to. The BMU module may be versatile and programmed for different use cases. Due to its small size as a result of the miniaturization, it could fit in a wide variety of pack designs without needing to design custom BMUs for each pack as is traditionally done. This provides a large degree of freedom in system architectures and pack designs. BMU module may be designed for different overarching goals such as high power and low-capacity cells as well as different chemistries.

Figure 5:
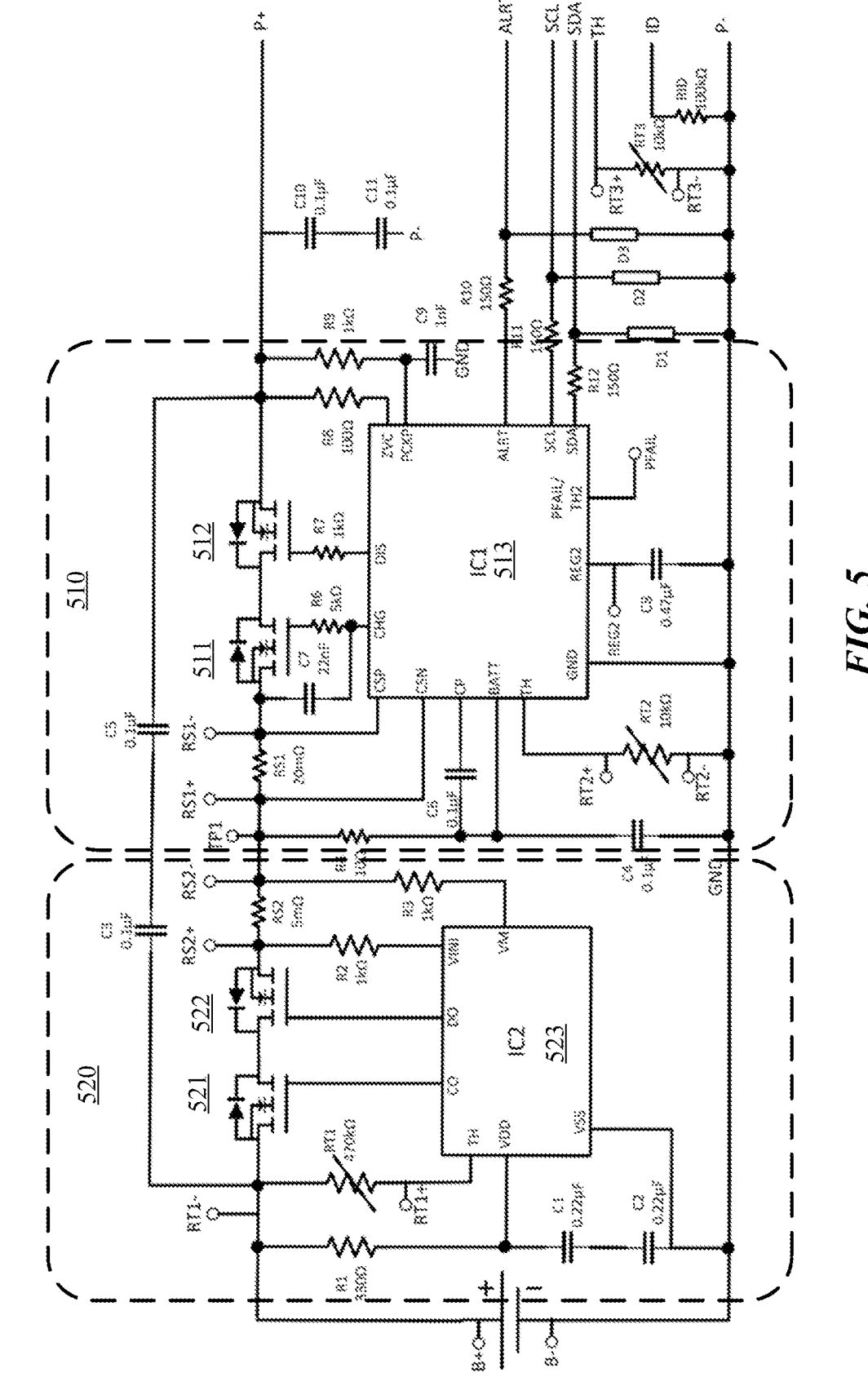
FIG. 5 illustrates an example scheme for standardizing BMU design using system-in-package modules.

FIG. 5 illustrates an example scheme 500 for standardizing BMU design using system-in-package modules. As an example and not by way of limitation, the BMU may include a primary protection module 510, a secondary protection module 530, etc. The primary protection module 510 may include a first power MOSFETs 511, a second power MOSFETs 512, an IC 513, etc., which may be attached to the same PCB (not shown). The power MOSFETs 512 and 513 may be embedded into that PCB or may be stacked above or under other components. The primary protection module 510 may be implemented in a SiP module and may be standardized and re-used in the BMU design process to simply the BMU design process. For example, the designer may direct use the SiP implementation of the BMU module from a pre-generated database, without needs to build the BMU from ground zero using separate components. As another example, the engineer may use the BMU implemented in the SiP directly off shelf without building the BMU model from each separate component. Such simplification in the BMU design and development process can significantly improve the BMU design quality and reduce the time. The secondary protection module 520 may include the power MOSFETS 521 and 522, and the protection IC 523. Similarly, the secondary protection module 520 may be implemented in a single SiP. The power MOSFETS 521 and 522 may be embedded into the associated PCB or may be stacked above or under other components to make the SiP module to have a smaller size.

Figure 6A:
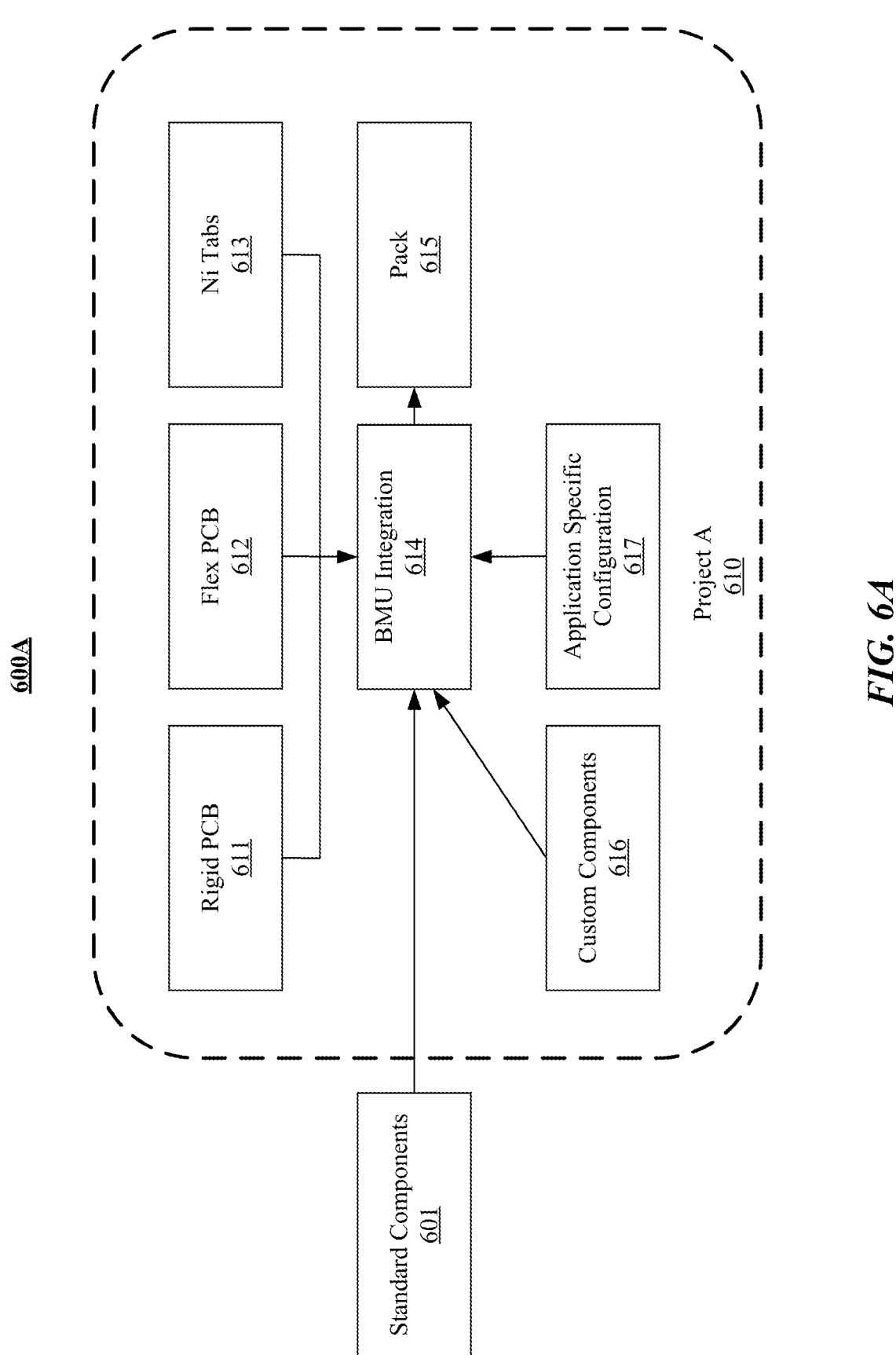
FIG. 6A illustrates an example workflow traditionally used in designing and developing BMUs.

FIG. 6A illustrates an example workflow 600A traditionally used in designing and developing BMUs. As shown in FIG. 6A, the traditional method for designing and developing BMUs have inefficiencies in design. In the traditional method, each design layout may be tied with specific custom components and BMU, which creates a lot of engineering resources and complicated supply chain workflow processes. The traditional BMU method is even worse when it comes to dual- or multi-sourcing. The only standardization may on the components in BOM (Bill of Materials). As an example and not by way of limitation, the traditional workflow for designing and developing BMUs may include the steps related to the rigid PCB 611, the flexible PCB 612, the Ni tabs 613, the BMU integration 614, and the packing 615.

For each project (e.g., the project A 610, the BMU integration 614 must be developed from the standard components 601 and the custom components 616, with the application specific configuration 617. Such process may be slow and inefficient because the engineers may have to build from the basic components.

Figure 6B:
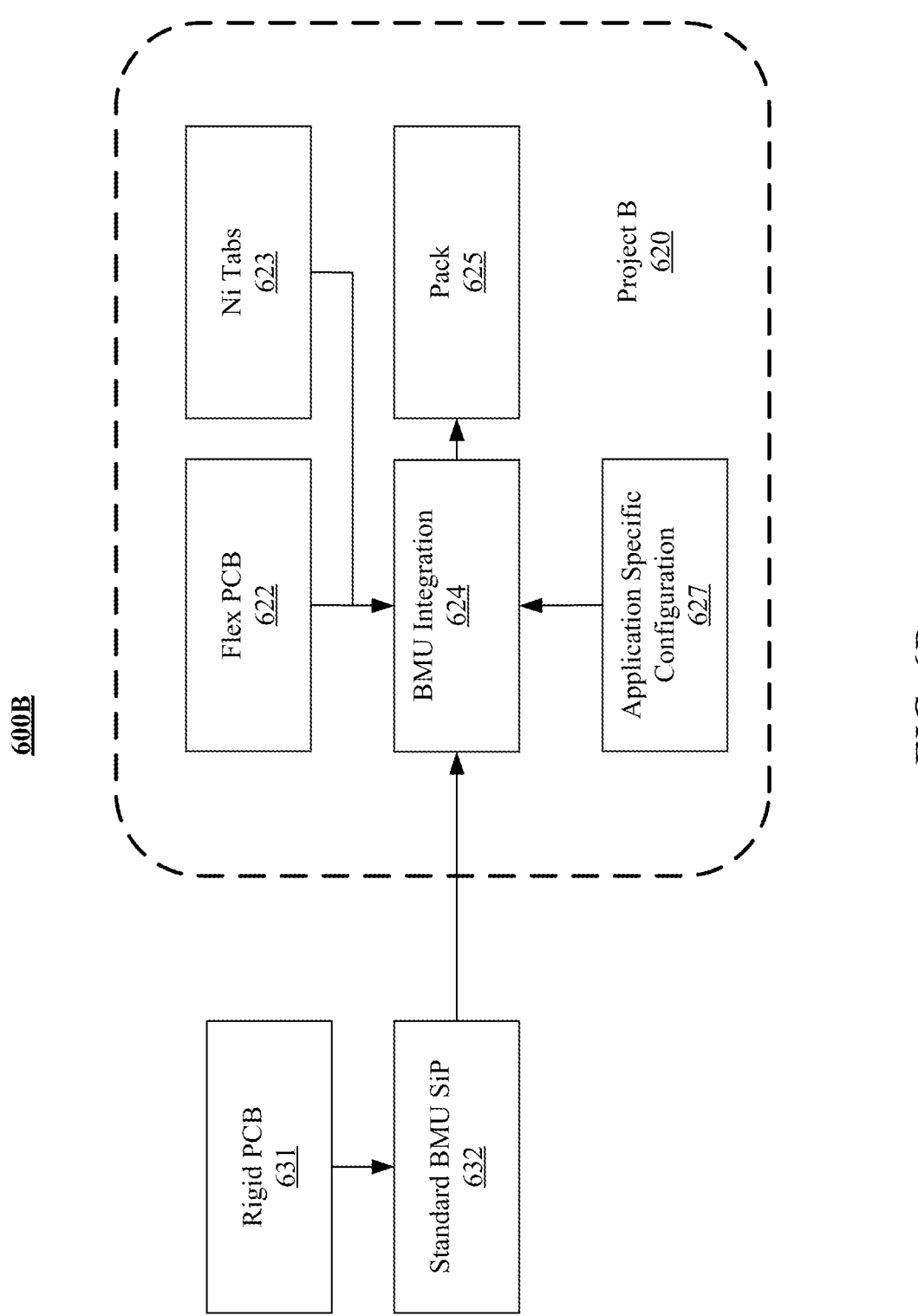
FIG. 6B illustrates an example workflow using standardized BMU SiP module.

FIG. 6B illustrates an example workflow 600B using standardized BMU SiP module 632. With the standard BMU SiP module 632, which has been built and tested and is ready to be applied to different applications, the workflow for designing and developing BMUs can be significantly simplified. Using this new method, the workflow may be based on using an integrated part (i.e., the BMU SiP), which is ready to use off shelf. Essentially this BMU SiP may work as a standard module that can be customized for any BMU application. It may be a universal design solution that can be used for multiple programs simultaneously. This standardization of custom parts allows scalability and flexibility in sourcing. These benefits translate to cost savings in R&D overhead with high efficiency as well as CapEx/OpEx and unit cost savings from a high volume/scalability. As an example and not by way of limitation, the workflow for designing and developing a BMU for the project B 620 may include the steps related to the rigid PCB 631, the standard BMU SiP module 632, the BMU integration 624 with the application specific configuration 627, and the packing 625. It is notable that this new workflow does not include the standard components and custom components as used in the traditional workflow. As such, the design process is significantly simplified with a shorter development cycle and higher efficiency.

FIG. 7 illustrates an example method 700 of designing BMU system-in-package (SiP) module with embedded components. The method may begin at step 710, where a computer system may access a number of components that will be used in the BMU SiP module. At step 720, the system may select a number of components to be embedded into the PCB based on one or more pre-determined criteria. At step 730, the system may generate a PCB design, wherein the PCB design includes at least three copper layers including a top copper layer, a middle copper layer, and a bottom copper layer. The top copper layer may be above the middle copper layer, which is above the bottom copper layer. At step 740, the system may generate a BMU SiP design, wherein the selected components are embedded in the middle copper layer of the PCB. The embedded components may be connected to other electrical components through copper plated pads and laser vias which are filled with copper. The embedded components may be connected to other components through the top copper layer or through the bottom copper layer. The BMU SiP design may include one or more configurable features that can be configured and customized based on the actual application requirements.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method of designing BMU system-in-package (SiP) module with embedded components including the particular steps of the method of FIG. 7, this disclosure contemplates any suitable method of designing BMU system-in-package (SiP) module with embedded components including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combinations of any suitable components, devices, or systems carrying out any suitable steps of the method of FIG. 7.

Figure 8:
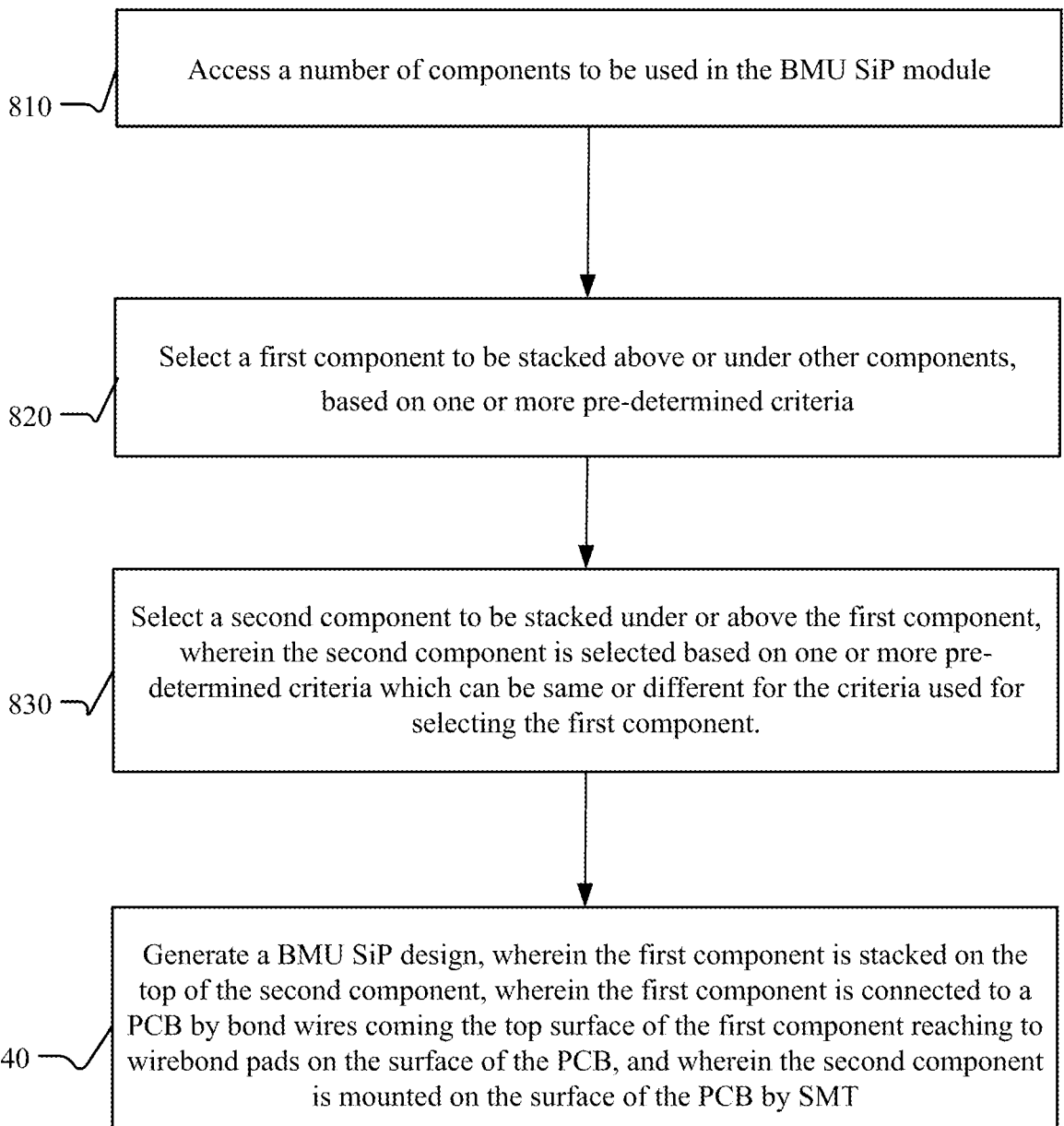
FIG. 8 illustrates an example method of designing BMU system-in-package (SiP) module with stacked components.

FIG. 8 illustrates an example method 800 of designing BMU system-in-package (SiP) module with stacked components. The method may begin at step 810, where a computer system may access a number of components to be used in the BMU SiP module. At step 820, the system may select a first component to be stacked above or under other components, based on one or more pre-determined criteria. At step 830, the system may select a second component to be stacked under or above the first component. The second component may be selected based on one or more pre-determined criteria which can be same or different for the criteria used for selecting the first component. At step 840, the system may generate a BMU SiP design, wherein the first component is stacked on the top of the second component. The first component is connected to a PCB by bond wires coming the top surface of the first component reaching to wirebond pads on the surface of the PCB. The second component may be mounted on the surface of the PCB by SMT. The first component may be larger, smaller, or may have the same size with the second component in the X-Y plane. Both the first component and the second component may be relative thin in the Z direction. In particular embodiments, the first component may be stacked under the second component. The first component may be mounted to the surface of the PCB using SMT. The second component on the top of the first component may be connected to the PCB through bond wires coming from the top surface of the second component reaching to the wirebond pads on the surface of the PCB. The first component may be larger, smaller, or may have the same size with the second component in the X-Y plane. Both the first component and the second component may be relative thin in the Z direction. The BMU SiP design may include one or more configurable features that can be configured and customized based on the actual application requirements.

In particular embodiments, for the BMU SiP applications, the same SiP module may be applied in multiple different products using the same architecture. In addition, the BMU using the SiP module would have a reduced volume for the module enabled by advanced packaging technologies such as embedding of components in the substrate. This reduced volume would not impact the cell design therefore can increase the volumetric energy density of the battery pack.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method of designing BMU system-in-package (SiP) module with stacked components including the particular steps of the method of FIG. 8, this disclosure contemplates any suitable method of designing BMU system-in-package (SiP) module with stacked components including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combinations of any suitable components, devices, or systems carrying out any suitable steps of the method of FIG. 8.

In particular embodiments, a battery monitoring unit for monitoring a battery pack may comprise a first power MOSFET transistor comprising at least three pads for connecting to one or more first electrical components, and a printed-circuit board comprising at least a first copper layer, a second copper layer, and a third copper layer. The first copper layer may comprise a plurality of vias that connect one or more second electrical components that are amounted on a surface of the printed-circuit board. The second copper layer may comprise a first area wherein copper material is excluded for embedding the first power MOSFET transistor. The first power MOSFET transistor may be embedded (1) in the first area of the second copper layer where the copper material is excluded, and (2) between the first copper layer and the third copper layer. The at least three pads of the power MOSFET may be plated with copper, and the first power MOSFET transistor may be connected to the one or more first electrical components through the at least three pads plated with copper.

In particular embodiments, a battery monitoring unit for monitoring a battery pack may comprise one or more resistors or capacitors that are embedded in a second area of the second copper layer of the printed-circuit board, wherein copper material is excluded from the second copper layer of the printed-circuit board. In particular embodiments, in the battery monitoring unit for monitoring a battery pack, the first power MOSFET transistor may be connected to the one or more first electrical components through the first copper layer of the printed-circuit board. The first copper layer includes a number of vias 215 that connect the one or more first electrical components, which are mounted on a surface of the printed circuit board, to the first copper layer. In particular embodiments, the first power MOSFET transistor may be connected to the one or more first electrical components through the first copper layer of the printed-circuit board. In particular embodiments, the MOSFET transistor may have a thickness dimension that is substantially less than the other two dimensions. In particular embodiments, the MOSFET transistor may have a first thickness less than a second thickness of the one or more first electrical components.

In particular embodiments, one or more connection pads that may be connected to respective connection terminals of a rigid printed-circuit board. In particular embodiments, the battery monitoring unit may be implemented as a system-in-package module. In particular embodiments, the battery monitoring unit may monitor one or more parameters of one or more battery units in the battery pack. In particular embodiments, the at least three pads that may be plated with copper are integrated with respective copper filled laser vias. In particular embodiments, the battery monitoring unit may further comprise: a second power MOSFET transistor having a first thickness, a first width, and a first length; and a third electrical component other than first power MOSFET transistor, the third electrical component having a second thickness, a second width, and a second length. In particular embodiments, the second power MOSFET transistor may be stacked on the third electrical component. In particular embodiments, the first width of the second power MOSFET transistor may be greater than the second width of the third electrical component, and wherein the first length of the second power MOSFET transistor is greater than the second length of the third electrical component.

In particular embodiments, the first width of the second power MOSFET transistor may be less than the second width of the third electrical component, and wherein the first length of the second power MOSFET transistor may be less than the second length of the third electrical component. In particular embodiments, the second power MOSFET transistor may be connected to one or more fourth electrical components through wire bounds. In particular embodiments, the wire bounds that connect the second power MOSFET transistor to the one or more fourth electrical components may come from one or more wirebond pads on a top surface of the second power MOSFET transistor. In particular embodiments, the third electrical component may be a protection IC. In particular embodiments, the third electrical component may be stacked on a top surface of the second power MOSFET transistor. In particular embodiments, the first width of the second power MOSFET transistor may be greater than the second width of the third electrical component, wherein the second width of the third component is less than the second length of the second power MOSFET transistor, and wherein the second power MOSFET transistor may be connected to one or more fourth electrical components through one or more wirebond pads on a top surface of the second power MOSFET transistor. In particular embodiments, the second power MOSFET transistor may be connected to one or more fourth electrical components through one or more wirebond pads on a bottom surface of the second power MOSFET transistor.

Figure 9:
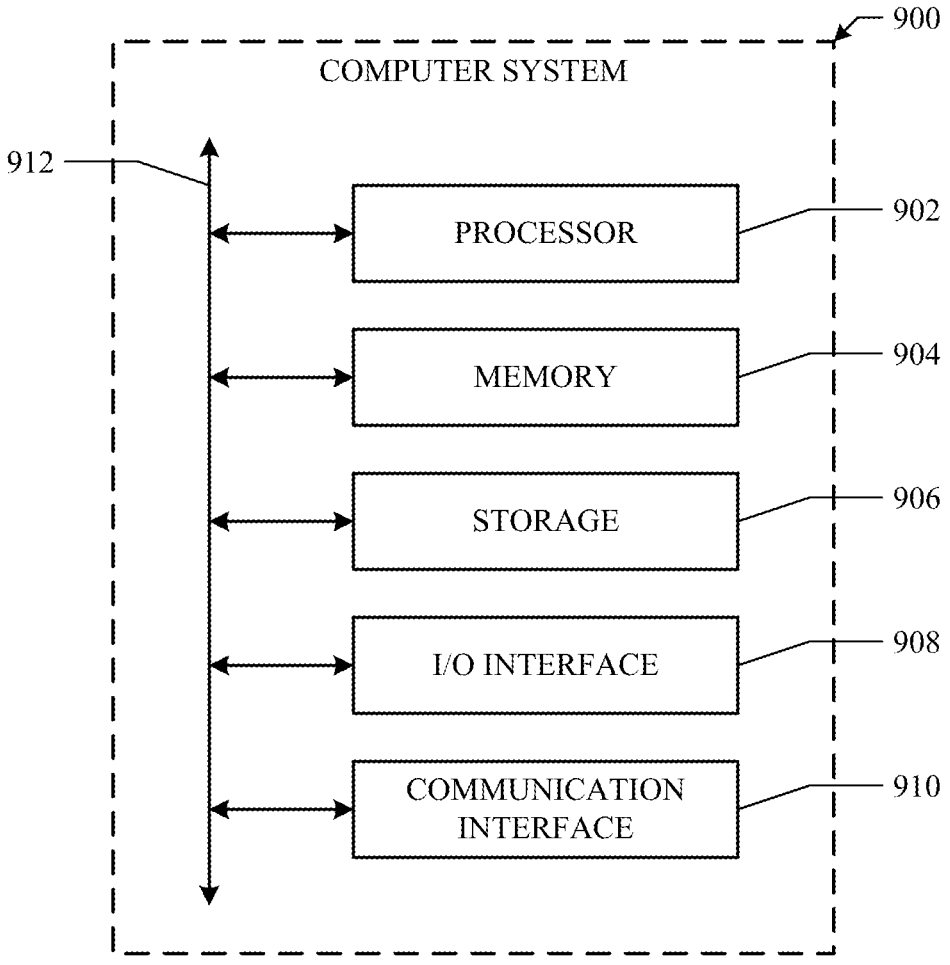
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A battery monitoring unit for monitoring a battery pack, comprising:

a first power MOSFET transistor comprising at least three pads for connecting to one or more first electrical components; and a printed-circuit board comprising at least a first copper layer, a second copper layer, and a third copper layer, wherein:

the first copper layer comprises a plurality of vias that connect one or more second electrical components that are mounted on a surface of the printed-circuit board;

the second copper layer comprises a first area wherein copper material is excluded for embedding the first power MOSFET transistor, and the first power MOSFET transistor is embedded (1) in the first area of the second copper layer where the copper material is excluded, and (2) between the first copper layer and the third copper layer; and the at least three pads of the first power MOSFET transistor are plated with copper, and the first power MOSFET transistor is connected to the one or more first electrical components through the at least three pads plated with copper.

2. The battery monitoring unit of claim 1, further comprising:

one or more resistors that are embedded in a second area of the second copper layer of the printed-circuit board, wherein the copper material is excluded from the second copper layer of the printed-circuit board.

3. The battery monitoring unit of claim 1, wherein the first power MOSFET transistor is connected to the one or more first electrical components through the first copper layer of the printed-circuit board.

4. The battery monitoring unit of claim 1, wherein the first power MOSFET transistor is connected to the one or more first electrical components through the first copper layer of the printed-circuit board.

5. The battery monitoring unit of claim 1, wherein the first power MOSFET transistor has a thickness dimension that is substantially less than the other two dimensions of the first power MOSFET transistor.

6. The battery monitoring unit of claim 1, wherein the first power MOSFET transistor has a first thickness less than a second thickness of the one or more first electrical components.

7. The battery monitoring unit of claim 1, further comprising one or more connection pads that are connected to respective connection terminals of a rigid printed-circuit board.

8. The battery monitoring unit of claim 1, wherein the battery monitoring unit is implemented as a system-in-package module.

9. The battery monitoring unit of claim 1, wherein the battery monitoring unit monitors one or more parameters of one or more battery units in the battery pack.

10. The battery monitoring unit of claim 1, wherein the at least three pads that are plated with copper are integrated with respective copper filled laser vias.

11. The battery monitoring unit of claim 1, further comprising:

a second power MOSFET transistor having a first thickness, a first width, and a first length; and a third electrical component other than the first power MOSFET transistor, the third electrical component having a second thickness, a second width, and a second length.

12. The battery monitoring unit of claim 11, wherein the second power MOSFET transistor is stacked on the third electrical component.

13. The battery monitoring unit of claim 12, wherein the first width of the second power MOSFET transistor is greater than the second width of the third electrical component, and wherein the first length of the second power MOSFET transistor is greater than the second length of the third electrical component.

14. The battery monitoring unit of claim 13, wherein the first width of the second power MOSFET transistor is less than the second width of the third electrical component, and wherein the first length of the second power MOSFET transistor is less than the second length of the third electrical component.

15. The battery monitoring unit of claim 11, wherein the second power MOSFET transistor is connected to one or more fourth electrical components through wire bounds.

16. The battery monitoring unit of claim 15, wherein the wire bounds that connect the second power MOSFET transistor to the one or more fourth electrical components come from one or more wire-bond pads on a top surface of the second power MOSFET transistor.

17. The battery monitoring unit of claim 11, wherein the third electrical component is a protection IC.

18. The battery monitoring unit of claim 11, wherein the third electrical component is stacked on a top surface of the second power MOSFET transistor.

19. The battery monitoring unit of claim 18, wherein the first width of the second power MOSFET transistor is greater than the second width of the third electrical component, wherein the second width of the third electrical component is less than the second length of the second power MOSFET transistor, and wherein the second power MOS- FET transistor is connected to one or more fourth electrical components through one or more wire-bond pads on a top surface of the second power MOSFET transistor.

20. The battery monitoring unit of claim 18, wherein the second power MOSFET transistor is connected to one or more fourth electrical components through one or more wire-bond pads on a bottom surface of the second power MOSFET transistor.

* * * * *